United States Patent
Galle, Sr. et al.

(10) Patent No.: US 6,494,499 B1
(45) Date of Patent: Dec. 17, 2002

(54) THREADED CONNECTOR FOR PIPE

(75) Inventors: Edward M. Galle, Sr., Friendswood, TX (US); Edward M. Galle, Jr., Kingwood, TX (US)

(73) Assignee: The Technologies Alliance, Inc., Houston, TX (US)

( * ) Notice: Subject to any disclaimer, the term of this patent is extended or adjusted under 35 U.S.C. 154(b) by 22 days.

(21) Appl. No.: 09/702,559

(22) Filed: Oct. 31, 2000

(51) Int. Cl.[7] .............................................. F16L 25/00

(52) U.S. Cl. .................... 285/334; 285/334.4; 285/355; 285/390; 285/333

(58) Field of Search ................................. 285/333, 334, 285/355, 390, 334.4

(56) References Cited

U.S. PATENT DOCUMENTS

| | | | |
|---|---|---|---|
| 4,076,436 A | * 2/1978 | Slator et al. | 403/343 |
| 4,113,290 A | * 9/1978 | Miida | 285/334 |
| 4,537,429 A | * 8/1985 | Landriault | 285/334 |
| 4,629,224 A | * 12/1986 | Landriault | 285/334 |
| 4,753,460 A | 6/1988 | Tung | |
| 4,842,464 A | 6/1989 | Green | |
| 4,892,337 A | 1/1990 | Gunderson et al. | |
| 5,355,968 A | * 10/1994 | Smith | 175/320 |
| 5,358,285 A | * 10/1994 | Wilson | 285/114 |
| 5,505,502 A | * 4/1996 | Smith et al. | 285/334 |
| 6,106,024 A | * 8/2000 | Herman et al. | 285/18 |

OTHER PUBLICATIONS

*Offshore Technology Conference*, OTC 7823, Design Analysis and Full Scale Prototype Testing of Auger TLP's 9–5/8" TLP Production Riser Weld–On Connector, pp 185–194 undated.

*RTI Energy Systems, Inc.*, Production Riser Threaded Connector, one page undated.

*Declaration*, Declaration of Kevin Gendron, Exhibit 1–9, 27 pages–Oct. 24, 2000.

* cited by examiner

Primary Examiner—Lynne H. Browne
Assistant Examiner—Giovanna Collins
(74) Attorney, Agent, or Firm—Bracewell & Patterson, L.L.P.

(57) ABSTRACT

A pipe connector for offshore risers has conical thread forms. The connector has a pin with a nose, an external shoulder, and conical first and second pin threaded sections. The first and second pin threaded sections are axially separated by a pin intermediate section that is free of threads. The first and second pin threaded sections are formed on a single continuous taper and on a continuous helix. The intermediate section is also conical and at the same taper as the pin first and second threaded sections. The connecter has a box with a rim, an internal base, and a conical receptacle between the rim and the base. The conical receptacle has first and second box threaded sections that make up with the pin threaded sections. The box also has an intermediate section between its first and second threaded connections that is free of threads. The intermediate sections make up with radial interference. Upper and lower metal-to-metal sealing surfaces are located at the nose and at the base of the pin.

28 Claims, 3 Drawing Sheets

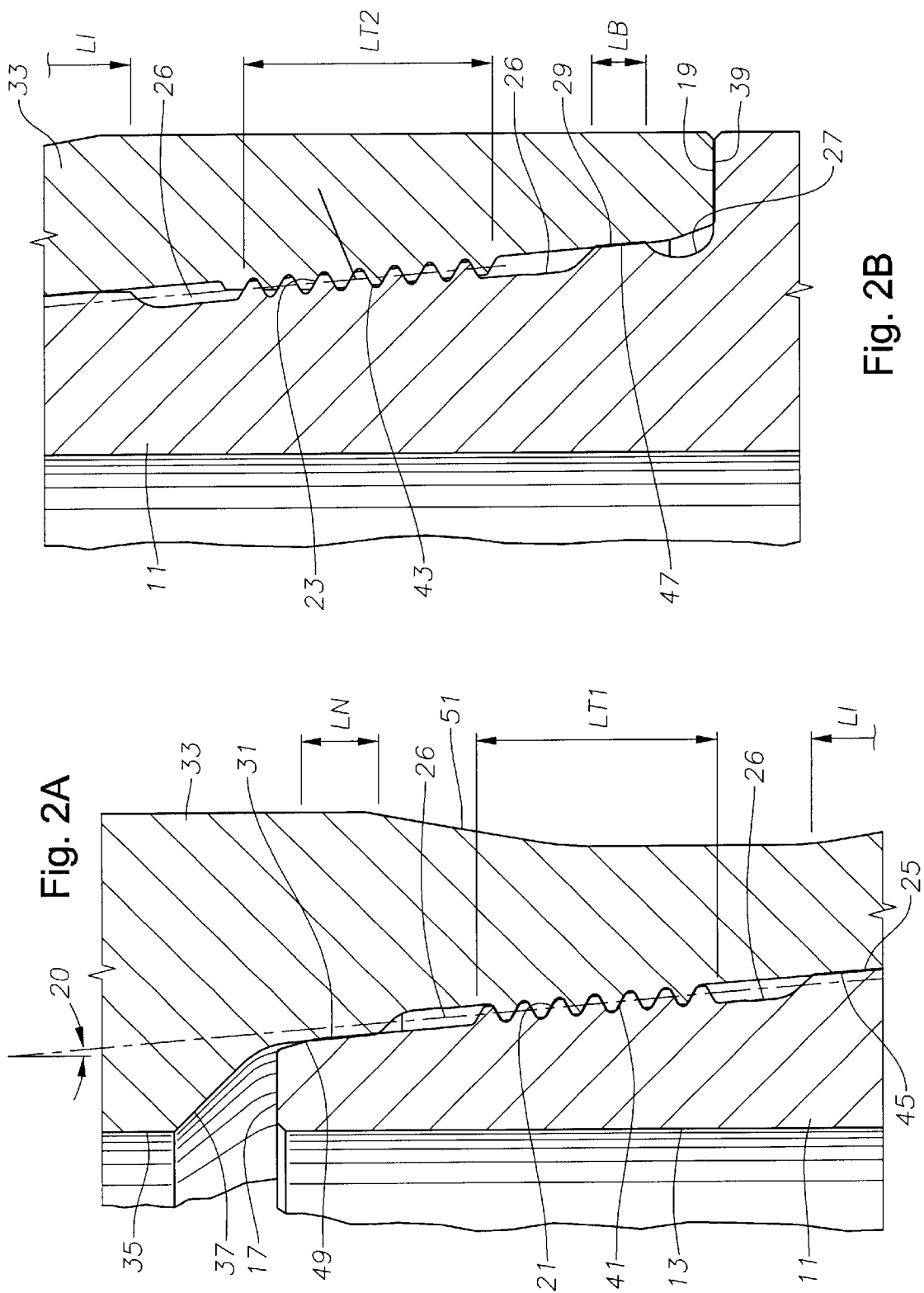

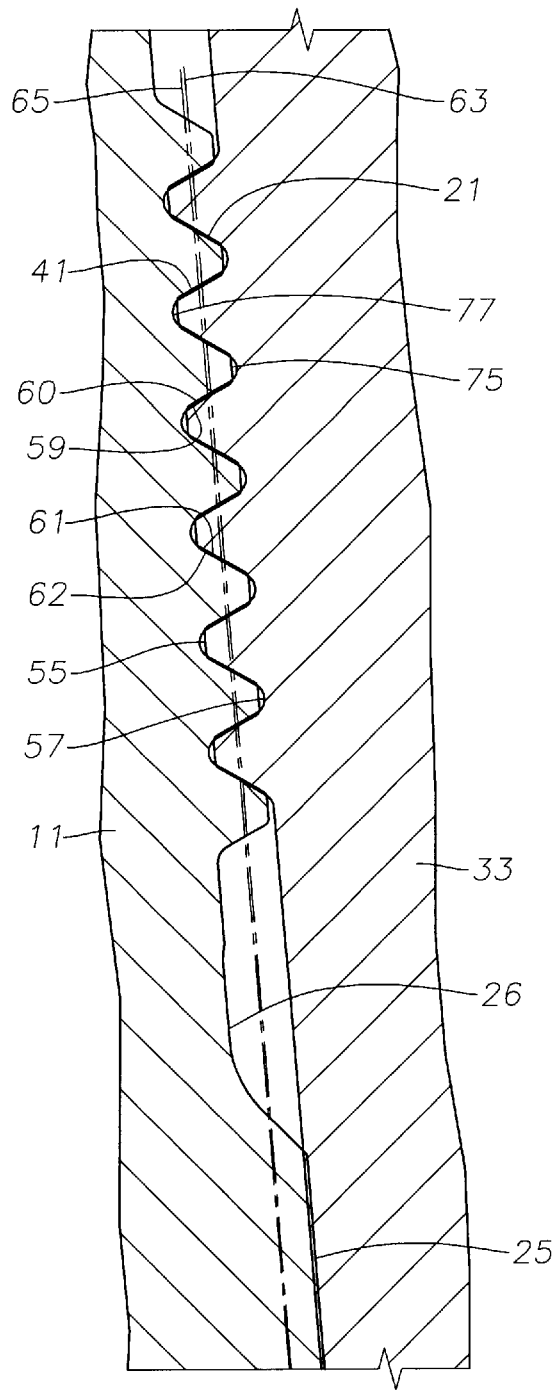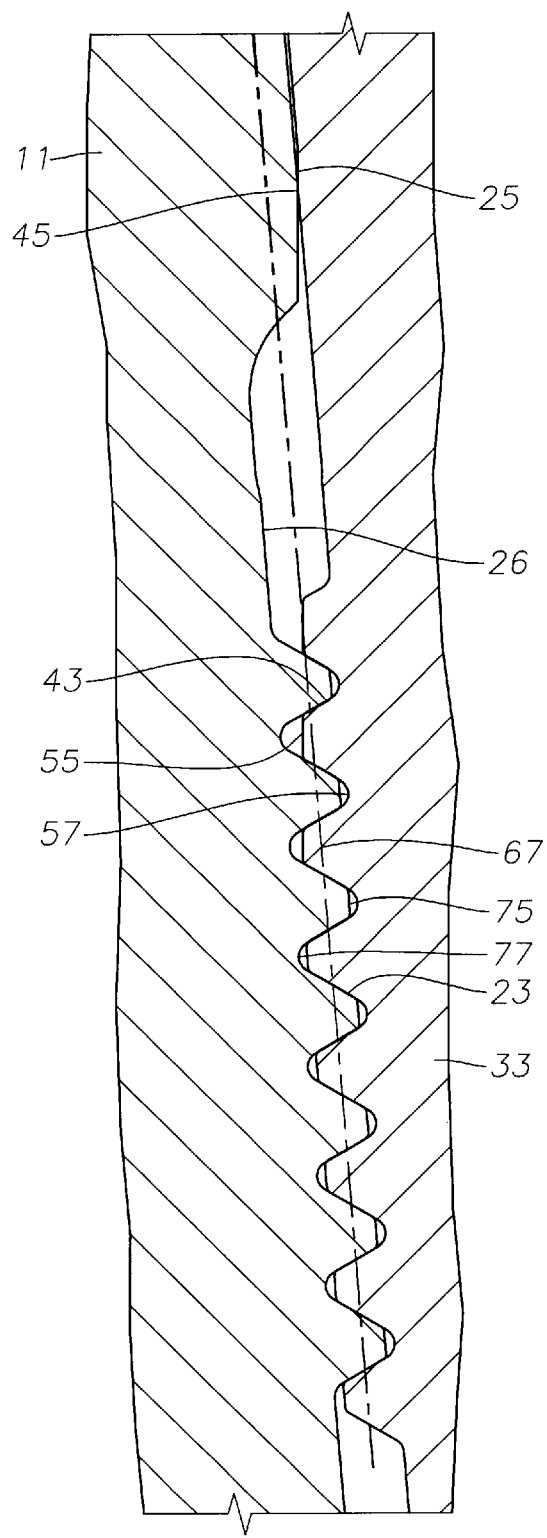
Fig. 3A
Fig. 3B

THREADED CONNECTOR FOR PIPE

TECHNICAL FIELD

This invention relates in general to threaded pipe connectors, and particularly to a riser pipe for an offshore well.

BACKGROUND OF THE INVENTION

In some offshore production facilities, riser pipes are used to convey well fluids from a wellhead at the sea floor to a production platform. The riser must provide sealing against high pressure for many years. Also, the riser must be able to accommodate bending moments and fatigue due to wind, waves, and current.

Threaded production riser comprises sections of pipe, each typically having a connector welded onto each end. One connector, referred to as the pin, inserts into a receptacle referred to as a box. The pin and box have conical threaded sections that engage each other. The pin has an external shoulder that makes up against the rim of the box. In some riser pipe, the pin and box have radial interference sections for forming metal-to-metal sealing surfaces near the external shoulder of the pin and near the nose of the pin. A stress relief groove may be located at the pin base.

While there are successful prior art connectors, improvements are desirable in reducing stress amplification factors throughout the connector, improving fatigue life, and reducing the potential for damage to the thread forms.

SUMMARY OF THE INVENTION

The pipe or connector of this invention has a pin with conical first and second pin threaded sections. The threaded sections are separated by a pin intermediate section that is free of threads. The first and second pin threaded sections are formed on a single continuous conical taper.

The box has a receptacle with first and second threaded sections that are configured to make up with the first and second pin threaded sections. Similarly, the first and second box threaded sections are separated axially by an intermediate section that is free of threads. The intermediate sections engage each other with radial interference, forming a metal-to-metal seal. Metal-to-metal seals are also located at the pin nose and at the pin base.

The first and second threaded sections are formed not only on the same conical angle, but also on the same helical pattern. Although the helix is interrupted by the intermediate section, the thread form of the second section is a continuation of the helix of the thread form of the first section. Preferably, the tapered pitch line of the pin threads differs slightly from the box tapered pitch line so as to form more radial interference between the threads near the nose of the pin than at the base of the pin.

A stress relief groove is located adjacent the external shoulder of the pin. One of the metal-to-metal sealing surfaces on the pin locates between the stress relief groove and one of the threaded sections. The other metal-to metal sealing surface is at the nose of the pin. The threads are preferably V-shaped, with blunt crests. The crests of the pin threads do not contact the roots of the box threads and vice-versa. Radial interference exists between the load flanks of the threads. A shallow recess is formed on the exterior of the box to reduce stiffness.

BRIEF DESCRIPTION OF THE DRAWINGS

FIGS. 2A and 2B comprise an enlarged vertical sectional view of a portion of the connector of FIG. 1.

FIGS. 3A and 3B comprise a further enlarged sectional view of a portion of the threaded connector of FIG. 1.

DETAILED DESCRIPTION OF THE INVENTION

Figure 1:
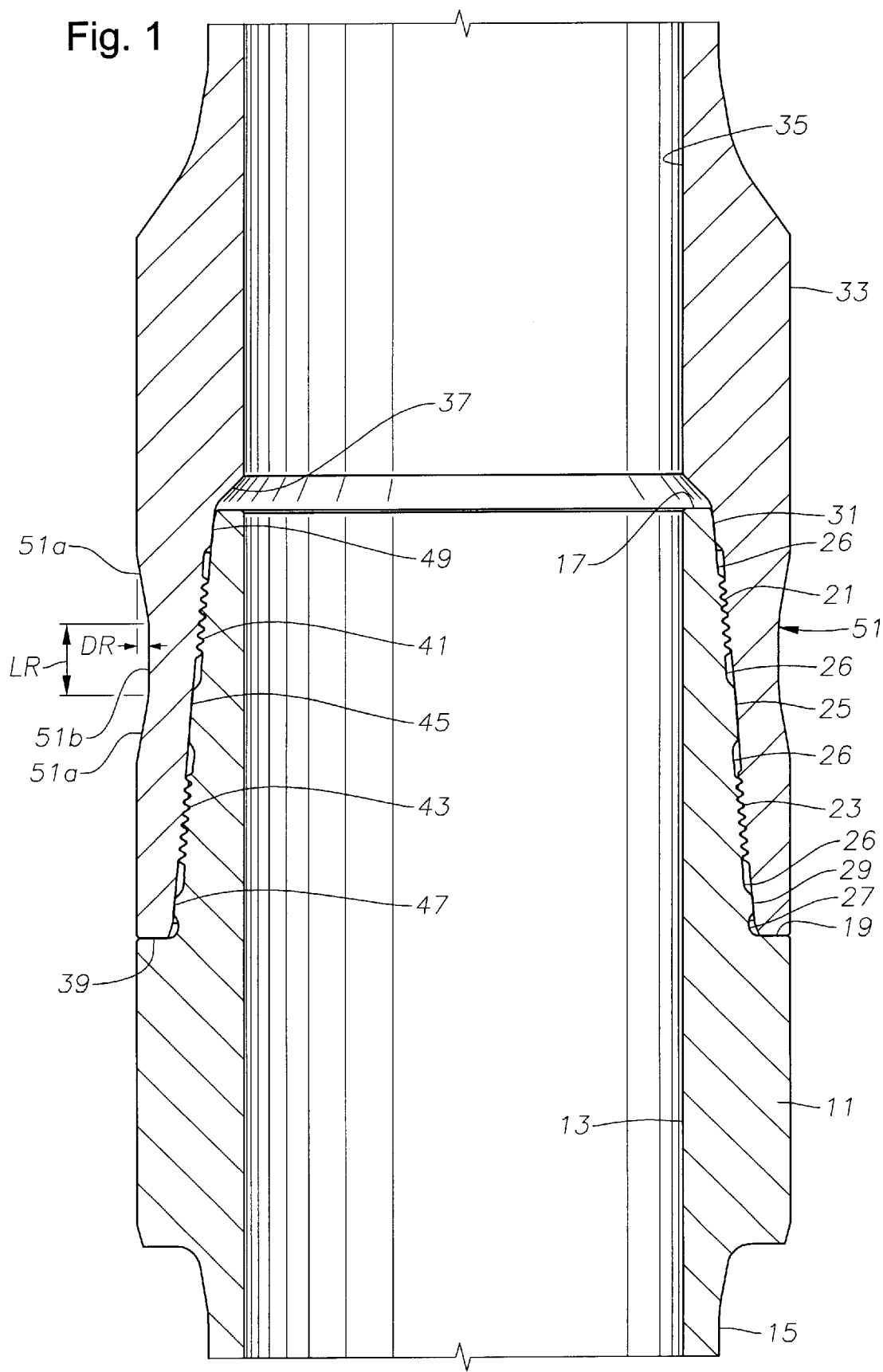
FIG. 1 is a vertical sectional view illustrating a threaded connector constructed in accordance with this invention.

Referring to FIG. 1, the riser threaded connector shown has a pin 11, which is a tubular member having a bore 13. Pin 11 is welded to one end of a section of pipe 15. Pin 11 has a nose 17 on its upper end when oriented as shown in FIG. 1. An external shoulder 19 faces upward and is located a selected distance below nose 17. The exterior surface of pin 11 between external shoulder 19 and nose 17 is a frusto-conical surface formed on a single conical taper angle 20 (FIG. 2A). Taper angle 20 is small enough to result in a locking taper, and in one embodiment is 4.57 degrees.

A pin first threaded section 21 is located a selected distance below nose 17. A pin second threaded section 23 is located below first threaded section 21 and above external shoulder 19. First and second threaded sections 21, 23, are formed on the same conical taper angle 20 (FIG. 2A) and on a single continuous helix. Second threaded section 23 is thus a continuation of first threaded section 21. An intermediate land or section 25 is located between the first and second threaded sections 21, 23, the intermediate section 25 being free of any threads. Intermediate section 25 is a single conical surface or land that is separated from first and second threaded sections 21, 23 by conventional thread runout grooves 26. Intermediate section 25 is formed at the same angle as conical taper angle 20 (FIG. 2A).

A conventional stress relief groove 27 is formed at the base of pin 11 adjacent to external shoulder 19. As shown also in FIG. 2B, stress relief groove 27 is preferably formed with a single elliptical concave surface with its major axis parallel to the centerline of the pin and has a depth at least equal to the depth of the thread forms of the first and second threaded sections 21, 23. A pin base sealing surface 29 is formed just above stress relief groove 27. Pin base sealing surface 29 is a single conical surface separated from pin second threaded section 23 by the lower thread runout groove 26.

A pin nose sealing surface 31 is located adjacent nose 17 and extends downward toward first threaded section 21. Pin nose sealing surface 31 is a conical surface and joins the upper thread relief groove 26 of pin first threaded section 21. Intermediate section 25, pin base sealing surface 29 and pin nose sealing surface 31 are all formed at the same taper angle 20.

A box 33 will be located at the opposite end from pin 11 of each joint of pipe 15. Box 33 has a receptacle with a bore 35. A conical base 37 is located at the upper end of the receptacle. Base 37 will be spaced above pin nose 17 when box 33 is fully made up with pin 11. Box 33 has a rim 39 opposite base 37 for engaging pin external shoulder 19.

Box 33 has first and second threaded sections 41, 43 that mate with pin first and second sections 21, 23, respectively. Box 33 has an intermediate section 45 that is a single conical surface for forming a metal-to-metal seal with pin intermediate surface 25. Box 33 has a sealing surface 47 located near rim 39 for forming a metal-to-metal seal with pin base sealing surface 29. A sealing surface 49 is formed just downward from base 37 in box 33 for forming a metal-to-metal seal with pin nose sealing surface 31. The pin conical surfaces 25, 29 and 31 have slightly larger outer dimensions than the inner dimensions of box conical surfaces 45, 47 and 49 so as to provide radial interference during make up. Pin shoulder 19 and box rim 39 have axial interference during makeup to provide connection preload and a metal-to-metal seal.

A shallow recess 51 is formed on the exterior of box 33 near box first threaded section 41. Recess 51 is a concave depression preferably formed by two frusto-conical surfaces 51a, each on opposite ends and leading to a bottom 51b, which is a central cylindrical surface. The axial length LR of bottom 51b of recess 51 is quite large relative to the radial depth DR of recess 51. In the embodiment shown, length LR is about four or five times the radial depth DR. The depth DR is also considerably smaller than the wall thickness of box 33. In the embodiment shown, depth DR is about 15 to 25 percent of the original wall thickness of box 33 measured before recess 51 was formed. The original box wall thickness is measured where the upper end of intermediate surface 25 contacts intermediate surface 45. Recess 51 is located closer to base 37 than to rim 39. The upper end of bottom 51b of recess 51 is preferably between the midpoint and upper end of first threaded sections 21, 41. The lower end of recess bottom 51b is preferably approximately at the upper end of where the upper end of intermediate surface 25 contacts intermediate surface 45.

Referring to FIGS. 2A and 2B, the axial lengths LT1 and LT2 of pin first and second threaded sections 21, 23 are selected so as to provide enough axial force to achieve the desired radial interference of the conical surfaces 25, 29 and 31, sustain axial interference between surfaces 19 and 39, and to resist external loading of the connection. In the embodiment shown, the lengths LT1 and LT2 are approximately the same, although this is not required. The axial distance between threaded sections 21 and 23 is somewhat larger than the lengths LT1 and LT2.

Intermediate section 45 is made as short as possible consistent with crests 55 of box threaded section 43 clearing the maximum diameter of pin intermediate section 25 when pin 11 and box 33 are stabbed together. The length of intermediate section 45 is dependent on the taper angle 20 as well as the thread height, intermediate section 25 length and required length for the two thread runouts 26. The axial length of intermediate section 25 is made no longer than necessary to accomplish a good metal-to-metal seal and to carry the compressive loads due to radial interference without causing yielding of the material of box 33 or pin 11. The length of intermediate section 45 is made as short as possible in order to make as compact a connector as possible. If compactness is not a major factor, longer intermediate sections 45 and 25 do not detract from performance.

In the embodiment shown, intermediate section length LI divided by first threaded section length LT1 is about 60%. The axial length LN of the engaging portions of nose sealing surfaces 31, 49 is less than that of the intermediate sealing surfaces 25, 45. The axial length LB of the pin base sealing surface 29 is less than the axial length LN of the engaging nose sealing surfaces 31, 49 in the embodiment shown.

Referring to FIGS. 3A and 3B, the thread form for threaded sections 21, 23 and 41, 43 is V-shaped. Each box thread has a blunt crest 55 and a rounded root 57 that separates it from an adjacent thread and each pin thread has a blunt crest 75 and a rounded root 77 that separates it from an adjacent thread. The threads are dimensioned so that each crest 55 of box 33 will be radially spaced from each root 77 of pin 11, and vice-versa, rather than engaging each other. Each thread of pin 11 has a load flank 59 that faces downward for engaging an upward facing box load flank 60.

Similarly, each thread of pin 11 has a stabbing flank 61 that faces upward for engaging a downward facing box stabbing flank 62.

The pin threaded sections 21, 23 have a common pitch line 63. Pitch line 63 is a line located radially between thread crests 75 and roots 77 and extending along the lengths of pin threaded sections 21, 23. Pitch line 63 is at an angle the same as conical taper angle 20 (FIG. 2A) relative to the axis. Similarly, box 33 has a box pitch line 65 that is formed at a box pitch angle. Pin pitch line 63 and box pitch line 65 are at slightly different angles, with pin pitch line 63 being at a slightly smaller angle relative to the longitudinal axis than box pitch line 65. The slight difference results in an intersection point 67 between pitch lines 63, 65 located in second threaded section 23, 43. As a result, the radial interference between first threaded sections 21, 41 is greater than the radial interference between second threaded sections 23, 43. The difference in the angles of pin pitch line 63 and box pitch line 65 is substantially not less than 2%.

In operation, preferably pin 11 will be facing upward during make up. However, box 33 could be facing up if desired. Box 33 will be lowered over pin 11 and the members rotated relative to each other. When fully made up, pin shoulder 19 will be exerting a preload axial force against box rim 39. Load flanks 59, 60, conical sealing surfaces 29 and 47, 25 and 45, and 31 and 49 engage each other in radial interference. All of the threads will have contact between the load flanks 59, 60, although most of the threads will not have contact of stabbing flanks 61, 62 at full makeup. At least the upper portion of first threaded sections 21, 41 near pin nose 17 will have stabbing flank 61, 62 contact at full make up.

After installation in a subsea environment, the connector will undergo tensile loading as well as bending due to wave motion, wind, and current. The bending results in compression and tension on opposite sides of pin 11 in box 33. The threads are able to carry this compression and tension without changing the load path or unloading the engagement of the threads. The load path still will pass through the load flanks 59, 60 due to the axial interference at make up. The conical surfaces 29 and 47, 25 and 45, and 31 and 49 provide primary sealing capabilities. If desired, however, elastomeric seals could be incorporated near pin nose 17 and/or pin shoulder 19 as backups.

The invention has significant advantages. The two thread groups spaced apart from each other by the intermediate section allow the connector to more efficiently distribute the loads carried by each thread. The external recess 51 on the box also helps to more uniformly distribute the loads carried by each thread. The slightly different tapers of the pin and box threads result in maximum radial interference near the nose of the pin. The connector is able to carry axial loads as well as bending loads without unloading engaging surfaces of the threads or the surfaces 19, 39. The sealing surfaces, being at the same taper as the threads, result in maximum contact pressure occurring towards the nose of the pin. Stress analysis has determined that an extremely low stress amplification factor occurs throughout the connector.

The intermediate interfering conical surfaces between the threaded sections provide efficiency in carrying bending loads across the connector, improving fatigue life. The thread form is of a known standard type that is robust and simple to manufacture. The conical taper provides long stab lengths to prevent cross threading during make up. The external shoulder on the pin, being perpendicular to the axis, simplifies manufacture and makes it resistant to damage during running and handling. Running the pin up reduces the potential for damage during rig handling since the box will be at the loose end of the suspended pipe joint rather than the pin.

Although the invention has been shown in only one of its forms, it should be apparent to those skilled in the art that it is not so limited but it is successful to various changes without departing from the scope of the invention.

We claim:

1. A pipe connector having a longitudinal axis, comprising:
    a pin having conical first and second pin threaded sections axially separated by a pin intermediate section that is free of threads, the first and second pin threaded sections being formed at a single continuous taper angle such that a straight line tangent to thread crests of the first pin threaded section is also tangent to thread crests of the second pin threaded section; and
    a box having a conical receptacle with first and second box threaded sections that make up with the first and second pin threaded sections, respectively, the first and second box threaded sections being separated axially by a box intermediate section that is free of threads.

2. The pipe connector according to claim 1, wherein the pin and box intermediate sections are conical and mate with each other, and wherein the pin and box intermediate sections are formed at a taper angle that is the same as the taper angle of the first and second pin threaded sections.

3. The pipe connector according to claim 1, wherein the pin and box intermediate sections are conical and engage each other in radial interference, forming a metal-to-metal seal, and wherein the straight line tangent to the thread crests of the first and second pin threaded sections also is parallel to the pin intermediate section.

4. The pipe connector according to claim 1, wherein the pin intermediate section is conical and formed at substantially the same angle as the continuous taper angle of the first and second pin threaded sections;
    the box intermediate section is conical and formed at substantially the same angle as the continuous taper angle of the first and second box threaded sections; and
    wherein the straight line tangent to the thread crests of the first and second pin threaded sections also is parallel to the pin intermediate section.

5. The pipe connector according to claim 1, wherein the box has a rim and an internal base, and wherein the pipe connector further comprises:
    a recess formed on an exterior cylindrical portion of the box closer to the base than to the rim, the recess having upper and lower frusto-conical sections that extend to the exterior cylindrical portion of the box and are separated by a central section, the recess having a radial depth in the central section that is much smaller than an axial length of the recess.

6. The pipe connector according to claim 1, wherein threads of the first pin threaded section are formed on a single continuous helix, and threads of the second pin threaded section are formed on a single continuous helix that is a continuation of the helix of the first pin threaded section.

7. The pipe connector according to claim 1, wherein the pin has an external shoulder, and the box has a rim that engages the external shoulder in axial interference at make-up.

8. The pipe connector according to claim 1, wherein the first and second pin threaded sections and the first and second box threaded sections engage each other, respectively, in radial and axial interference at make-up.

9. The pipe connector according to claim 1, wherein the pin has an external shoulder and the box has an internal base, and wherein the pipe connector further comprises:
    metal-to-metal conical sealing surfaces adjacent the external shoulder of the pin and the internal base of the box; and
    a stress relief groove formed on the pin between the conical sealing surface on the pin and the external shoulder, the stress relief groove being free of any seals.

10. The pipe connector according to claim 1, wherein the pin has a single, straight tapered pitch line extending from a lower end of the second pin threaded section to an upper end of the first pin threaded section, and the box has a single, straight tapered pitch line that extends from an upper end of the first box threaded section to a lower end of the second box threaded section and tapers at a different angle than the pin tapered pitch line.

11. The pipe connector according to claim 1, wherein:
    the pin has a nose, the first pin threaded section being located adjacent the nose;
    the box has a rim, the second box threaded section being located adjacent the rim; and
    the pin has a single, straight pin tapered pitch line extending from a lower end of the second pin threaded section to an upper end of the first pin threaded section, and the box has a single, straight box tapered pitch line that extends from an upper end of the first box threaded section to a lower end of the second box threaded section and tapers at a different angle than the pin tapered pitch line and is positioned to create more radial interference in the first pin and box threaded sections than in the second pin and box threaded sections.

12. The pipe connector according to claim 11, wherein the difference between the angle of the box tapered pitch line and the pin tapered pitch line is substantially not less than 2%.

13. The pipe connector according to claim 1, wherein the pin has an external shoulder and wherein the pipe connector further comprises:
    a stress relief groove formed on the pin adjacent the external shoulder, the stress relief groove being free of any seals;
    a conical pin sealing surface formed on the pin between the stress relief groove and the pin second threaded section; and
    a conical box sealing surface formed in the receptacle of the box for metal-to-metal sealing engagement with the pin sealing surface.

14. A pipe connector having a longitudinal axis, comprising:
    a pin having a nose, an external shoulder, and conical first and second pin threaded sections axially separated by a pin intermediate section that is free of threads, the first and second pin threaded sections being formed on a single continuous taper and on a single continuous helix that is the same for both of the pin threaded sections, with the first pin threaded section located closer to the nose than the external shoulder;
    the pin intermediate section being conical and at substantially the same taper as the first and second pin threaded sections;
    a box having a rim, an internal base, and a conical receptacle between the rim and the base, the conical receptacle having first and second box threaded sections that make up with the first and second pin threaded sections, respectively, the first and second box threaded sections being separated axially by a box intermediate section that is free of threads, the first box threaded section being located closer to the internal base than to the rim; and the box intermediate section being conical and engaging the pin intermediate section with radial interference.

15. The pipe connector according to claim 14, further comprising:

a recess formed on an exterior cylindrical portion of the box closer to the internal base than to the rim, the recess having upper and lower frusto-conical sections separated by a cylindrical section, the upper and lower frusto-conical sections extending from the cylindrical section of the recess to the cylindrical portion of the box, the recess having a radial depth in the cylindrical section that is much smaller than an axial length of the recess.

16. The pipe connector according to claim 14, wherein:

the first and second pin and box threaded sections have a V-shaped thread form that has a stabbing flank separated from a load flank by a root, and a blunt crest that joins the stabbing flank and the load flank;

the external shoulder of the pin engages the rim of the box in axial interference at makeup, causing the load flanks of the first and second pin threaded sections to engage the load flanks of the first and second box threaded sections, respectively, in radial and axial interference; and the crests of the first and second pin threaded sections are radially spaced from the roots of the first and second box threaded sections, respectively.

17. The pipe connector according to claim 14, further comprising:

metal-to-metal conical sealing surfaces adjacent the external shoulder of the pin and the internal base of the box; and a stress relief groove formed on the pin between the conical sealing surface on the pin and the external shoulder, the stress relief groove being free of any seals.

18. The pipe connector according to claim 14, wherein the pin has a single, straight tapered pitch line extending from a lower end of the second pin threaded section to an upper end of the first pin threaded section, and the box has a single, straight tapered pitch line that extends from an upper end of the first box threaded section to a lower end of the second box threaded section and tapers at a different angle than the pin tapered pitch line and is positioned to create more radial interference in the pin and box first threaded sections than in the pin and box second threaded sections.

19. The pipe connector according to claim 14, further comprising:

a stress relief groove formed on the pin adjacent the external shoulder, the stress relief groove being free of seals;

a conical pin sealing surface formed on the pin between the stress relief groove and the second pin threaded section; and a conical box sealing surface formed in the receptacle of the box for metal-to-metal sealing engagement with the pin sealing surface.

20. A pipe connector having a longitudinal axis, comprising:

a pin having a nose, an external shoulder, and conical first and second pin threaded sections axially separated by a pin intermediate section that is free of threads, the first and second pin threaded sections being formed on a single continuous taper and having threads with crests formed on a continuous helix that is the same for both the first and second pin threaded sections, with the first pin threaded section located closer to the nose than to the external shoulder;

the threads of the first and second pin threaded sections being formed on a single conical surface such that a straight line tangent to the thread crests of the first pin threaded section is also tangent to the thread crests of the second pin threaded section;

the pin intermediate section being conical and at substantially the same taper as the pin first and second threaded sections, the line tangent to the thread crests of the first and second pin threaded sections also being parallel to the pin intermediate section;

a box having a rim, an internal base, and a conical receptacle between the rim and the base, the conical receptacle having first and second box threaded sections having threads that make up with the first and second pin threaded sections, respectively, the first and second box threaded sections being separated axially by a box intermediate section that is free of threads, the first box threaded section being located closer to the internal base than to the rim;

the box intermediate section being conical and engaging the pin intermediate section with radial interference, forming a metal-to-metal seal;

first conical sealing surfaces in the receptacle of the box, between the base and the first box threaded section, and on the pin between the nose and the first pin threaded section, the first conical sealing surfaces engaging each other in metal-to-metal sealing contact;

second conical sealing surfaces in the receptacle of the box, between the rim and the second box threaded section, and on the pin between the external shoulder and the second pin threaded section, the second conical sealing surfaces engaging each other in metal-to-metal sealing contact; and a recess on the exterior of the box, the recess having first and second frusto-conical sections separated by a central section, the central section having a radial depth much smaller than its axial length.

21. The pipe connector according to claim 20, wherein the pin has a single, straight pin tapered pitch line extending from a lower end of the second pin threaded section to an upper end of the first pin threaded section, and the box has a single, straight box tapered pitch line that extends from an upper end of the first box threaded section to a lower end of the second box threaded section and tapers at a different angle than the pin tapered pitch line and is positioned to create more radial interference in the pin and box first threaded sections than in the pin and box second threaded sections, the difference between the box tapered pitch line and the pin tapered pitch line being substantially not less than 2%.

22. The pipe connector according to claim 20, wherein:

the threads of the first and second pin and box threaded sections have stabbing flanks separated from load flanks by roots, the crests being blunt and joining the stabbing flanks and the load flanks;

the external shoulder of the pin engages the rim of the box in axial interference at make-up, causing the load flanks of the first and second pin threaded sections to engage the load flanks of the first and second box threaded sections, respectively, in radial and axial interference; and the crests of the first and second pin threaded sections are radially spaced from the roots of the first and second box threaded sections, respectively.

23. The pipe connector according to claim 20, further comprising:

a stress relief groove formed on the pin adjacent the external shoulder, the stress relief groove being free of any seals;

a conical pin sealing surface formed on the pin between the stress relief groove and the pin second threaded section; and a conical box sealing surface formed in the receptacle of the box for metal-to-metal sealing engagement with the pin sealing surface.

24. A pipe connector having a longitudinal axis, comprising:

a pin having pin threads;

a box having box threads that make up with the pin threads;

a recess on a cylindrical exterior portion of the box radially outward from a portion of the box threads to reduce hoop stiffness, the recess having upper and lower frusto-conical sections separated by a central section, the upper and lower frusto-conical sections extending from the central section to the cylindrical exterior portion of the box, the central section having a radial depth much smaller than its axial length; and wherein the box has a rim and the box threads have a base, and the recess is between the base and the rim and closer to the base than to the rim.

25. The pipe connector according to claim 24, wherein the central section of the recess comprises a cylindrical surface.

26. The pipe connector according to claim 24, wherein the axial length is at least four times its depth.

27. The pipe connector according to claim 24, wherein the depth of the central section of the recess has a deepest point, and the box has an original wall thickness prior to the recess being formed, the depth at the deepest point being at least 15% of the original wall thickness.

28. The pipe connector according to claim 27, wherein the depth at the deepest point is not substantially greater than 25% of the original wall thickness.

* * * * *